(12) United States Patent
Bill et al.

(10) Patent No.: US 11,681,780 B2
(45) Date of Patent: Jun. 20, 2023

(54) ANNOTATION AND MAPPING FOR VEHICLE OPERATION IN LOW-CONFIDENCE OBJECT DETECTION CONDITIONS

(71) Applicant: Nissan North America, Inc., Franklin, TN (US)

(72) Inventors: Luis Lorenzo Bill, Daly City, CA (US); David Ilstrup, Santa Cruz, CA (US); Stefan Witwicki, San Carlos, CA (US); Kyle Hollins Wray, Fremont, CA (US)

(73) Assignee: Nissan North America, Inc., Franklin, TN (US)

( * ) Notice: Subject to any disclaimer, the term of this patent is extended or adjusted under 35 U.S.C. 154(b) by 79 days.

(21) Appl. No.: 17/039,270

(22) Filed: Sep. 30, 2020

(65) Prior Publication Data
US 2022/0101723 A1 Mar. 31, 2022

(51) Int. Cl.
*G06F 18/25* (2023.01)

(52) U.S. Cl.
CPC .................. *G06F 18/256* (2023.01)

(58) Field of Classification Search
CPC combination set(s) only.
See application file for complete search history.

(56) References Cited

U.S. PATENT DOCUMENTS

| | | | |
|---|---|---|---|
| 8,559,673 B2 | 10/2013 | Fairfield et al. | |
| 8,761,991 B1* | 6/2014 | Ferguson | G08G 1/096758 701/28 |
| 9,779,314 B1* | 10/2017 | Wendel | B60W 30/00 |
| 9,990,548 B2 | 6/2018 | Wellington et al. | |
| 10,210,408 B2 | 2/2019 | Ferguson et al. | |

(Continued)

FOREIGN PATENT DOCUMENTS

EP 3650294 A1 5/2020

OTHER PUBLICATIONS

Kim et al., An Efficient Color Space for Deep-Learning Based Traffic Light Recognition; Journal of Advanced Transportation; vol. 2018; Artice ID 2365414; 13 pages.
Krylov et al., Object Geolocation Using MRF Based Multi-Sensor Fusion; ADAPT Centre, School of Computer Science and Statistics, Trinity College Dublin, Dublin, Ireland; Oct. 2018; 5 pages.
Levinson et al., Robust Real-Time Tracking Combining 3D Shape, Color, and Motion; The International Journal of Robotics Research; 2015; 28 pages.

(Continued)

*Primary Examiner* — Anne Marie Antonucci
*Assistant Examiner* — Amelia Vorce
(74) *Attorney, Agent, or Firm* — Young Basile Hanlon & MacFarlane, P.C.

(57) ABSTRACT

A vehicle receives sensor data from at least one of its sensors as it approaches an intersection and determines whether a traffic flow control device for the intersection is detected. When detected, a detected type, a detected state, or both of the traffic flow control device is determined. Using a type of the intersection, at least one of an existing type or an existing state of the traffic flow control device is determined, where the traffic flow control device is undetected or the detected type, the detected state, or both are determined with a detection confidence less than a defined level of detection confidence. The traffic flow control device is tagged with a label including its location and existing type, the existing state, or both within at least one control system for the vehicle. The vehicle is operated within vehicle transportation network using a control system that incorporates the label.

20 Claims, 7 Drawing Sheets

(56) References Cited

U.S. PATENT DOCUMENTS

| | | | | |
|---|---|---|---|---|
| 10,467,487 | B1* | 11/2019 | Wang | G05D 1/0088 |
| 10,525,903 | B2* | 1/2020 | Laur | G06V 20/584 |
| 10,936,902 | B1* | 3/2021 | Bagwell | G06T 7/73 |
| 11,227,409 | B1* | 1/2022 | Wu | G01S 17/86 |
| 2013/0325344 | A1 | 12/2013 | Yester | |
| 2017/0124781 | A1* | 5/2017 | Douillard | G01S 17/931 |
| 2018/0012088 | A1 | 1/2018 | Matsuo et al. | |
| 2019/0047584 | A1 | 2/2019 | Donnelly | |
| 2019/0065871 | A1* | 2/2019 | Pogorelik | G05D 1/0088 |
| 2019/0332875 | A1* | 10/2019 | Vallespi-Gonzalez | G05D 1/0088 |
| 2019/0391587 | A1 | 12/2019 | Uvarov et al. | |
| 2020/0026288 | A1 | 1/2020 | Herz et al. | |
| 2020/0081450 | A1* | 3/2020 | Creusot | G08G 1/09623 |
| 2020/0269877 | A1 | 8/2020 | Mortazavi et al. | |
| 2020/0284607 | A1* | 9/2020 | Mangal | G06V 20/584 |
| 2020/0292322 | A1* | 9/2020 | Ozog | G06V 20/582 |
| 2021/0004363 | A1* | 1/2021 | Bailly | G01C 21/3848 |
| 2021/0035314 | A1* | 2/2021 | Shu | G01C 21/3811 |
| 2021/0125431 | A1* | 4/2021 | Mcgill | G01S 13/931 |
| 2021/0166044 | A1* | 6/2021 | Ferguson | G06V 20/584 |
| 2021/0191419 | A1* | 6/2021 | Xu | G06V 20/20 |
| 2021/0211568 | A1* | 7/2021 | Zhou | H04N 5/2351 |
| 2021/0261152 | A1* | 8/2021 | Meijburg | G01S 19/485 |
| 2021/0390349 | A1* | 12/2021 | Hotson | B60W 40/04 |
| 2021/0404841 | A1* | 12/2021 | Das | G06K 9/6256 |
| 2022/0076037 | A1* | 3/2022 | Hochman | G05D 1/0246 |

OTHER PUBLICATIONS

Charette et al., Traffic Light Recognition Using Image Processing Compared to Learning Processes; 2009 IEEE/RSH International Conference on Intelligent Robots and Systems; Oct. 2009; 6 pages.

Trehard et al., Tracking Both Pose and Status of a Traffic Light Via an Interacting Multiple Model Filter; Jul. 2014; 7 pages.

Thrun et al., The GraphSLAM Algorithm with Applications to Large-Scale Mapping of Urban Structures; The International Journal of Robotics Research, vol. 25, No. 5-6, May-Jun. 2006; pp. 403-429.

Fairfield et al., Traffic Light Mapping and Detection; 2011 IEEE International Conference on Robotics and Automoation; May 2011; 6 pages.

Levinson et al., Traffic Light Mapping, Localization, and State Detetion for Autonomous Vehicles; 2011 IEEE International Conference on Robotics and Automation, Shanghai, 2011, pp. 5784-5791.

Kim et al., Traffic Light Recognition Based on Binary Semantic Segmentation Network; Sensors 2019, 19, 1700; 15 pages.

Basich et al., Learning to Optimize Autonomy in Competence-Aware Systems; Proc. of the 19th International Conference on Autonomous Agents and Multiagent Systems (AAMAS 2020); May 2020; 9 pages.

Wray et al., Online Decision-Making for Scalable Autonomous Systems; Proceedings of the Twenty-Sixth International Joint Conference on Artificial Intelligence; AI and autonomy track, 2017. pp. 4768-4774.

\* cited by examiner

ANNOTATION AND MAPPING FOR VEHICLE OPERATION IN LOW-CONFIDENCE OBJECT DETECTION CONDITIONS

TECHNICAL FIELD

This disclosure relates generally to vehicle operational management and driving, and more particularly to using annotation and mapping for vehicle operation in low-confidence object detection conditions.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action in response to the captured data. The action may be selected using artificial intelligence (e.g., trained machine-learning models) or other decision-making models.

SUMMARY

Disclosed herein are aspects, features, elements, implementations, and embodiments for annotation and mapping for vehicle operation in low-confidence object detection conditions. The disclosure allows for operation decisions even in the absence of or imperfections in input data.

An aspect of the disclosed embodiments is a method of operating a vehicle that includes receiving, at a processor of the vehicle, sensor data from at least one vehicle-mounted sensor as the vehicle approaches an intersection within a vehicle transportation network, determining, using the sensor data, whether a traffic flow control device for the intersection is detected, and determining, when the traffic control device is detected, at least one of a detected type or a detected state of the traffic flow control device. The method also includes determining, using the processor and a type of the intersection, at least one of an existing type or an existing state of the traffic flow control device, wherein at least one of the traffic flow control device is undetected or the at least one of the detected type or the detected state of the traffic flow control device is determined with a detection confidence that is less than a defined level of detection confidence, tagging, within at least one control system for the vehicle, the traffic flow control device with a label including a location of the traffic flow control device and the at least one of the existing type or the existing state of the traffic flow control device, and operating the vehicle within the vehicle transportation network using the at least one control system that incorporates the label for the traffic flow control device.

Another aspect of the disclosed embodiments is an apparatus for operating a vehicle. The apparatus includes a processor configured to receive sensor data from at least one vehicle-mounted sensor as the vehicle approaches an intersection within a vehicle transportation network, determine, using the sensor data, whether a traffic flow control device for the intersection is detected, and determine, when the traffic control device is detected, at least one of a detected type or a detected state of the traffic flow control device. The processor is also configured to determine, using a type of the intersection, at least one of an existing type or an existing state of the traffic flow control device, wherein at least one of the traffic flow control device is undetected or the at least one of the detected type or the detected state of the traffic flow control device is determined with a detection confidence less than a defined level of detection confidence, and tag, within at least one control system for the vehicle, the traffic flow control device with a label including a location of the traffic flow control device and the at least one of the existing type or the existing state of the traffic flow control device. The vehicle is configured to operate within the vehicle transportation network using the at least one control system that incorporates the label for the traffic flow control device.

Another aspect of the disclosed embodiments is a vehicle that includes at least one vehicle-mounted sensor, at least one control system, and a processor. The processor is configured to receive sensor data from the at least one vehicle-mounted sensor as the vehicle approaches an intersection within a vehicle transportation network, determine, using the sensor data, whether a traffic flow control device for the intersection is detected, and determine, when the traffic control device is detected, at least one of a detected type or a detected state of the traffic flow control device. The processor is also configured to determine, using an identification of the intersection, at least one of an existing type or an existing state of the traffic flow control device, wherein at least one of the traffic flow control device is undetected by the sensor data or the at least one of the detected type or the detected state of the traffic flow control device is determined with a detection confidence that is less than a defined level of detection confidence, and tag, within the at least one control system, the traffic flow control device with a label including a location of the traffic flow control device and the at least one of the existing type or the existing state of the traffic flow control device. The vehicle is configured to operate the vehicle within the vehicle transportation network using the at least one control system that incorporates the label for the traffic flow control device.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
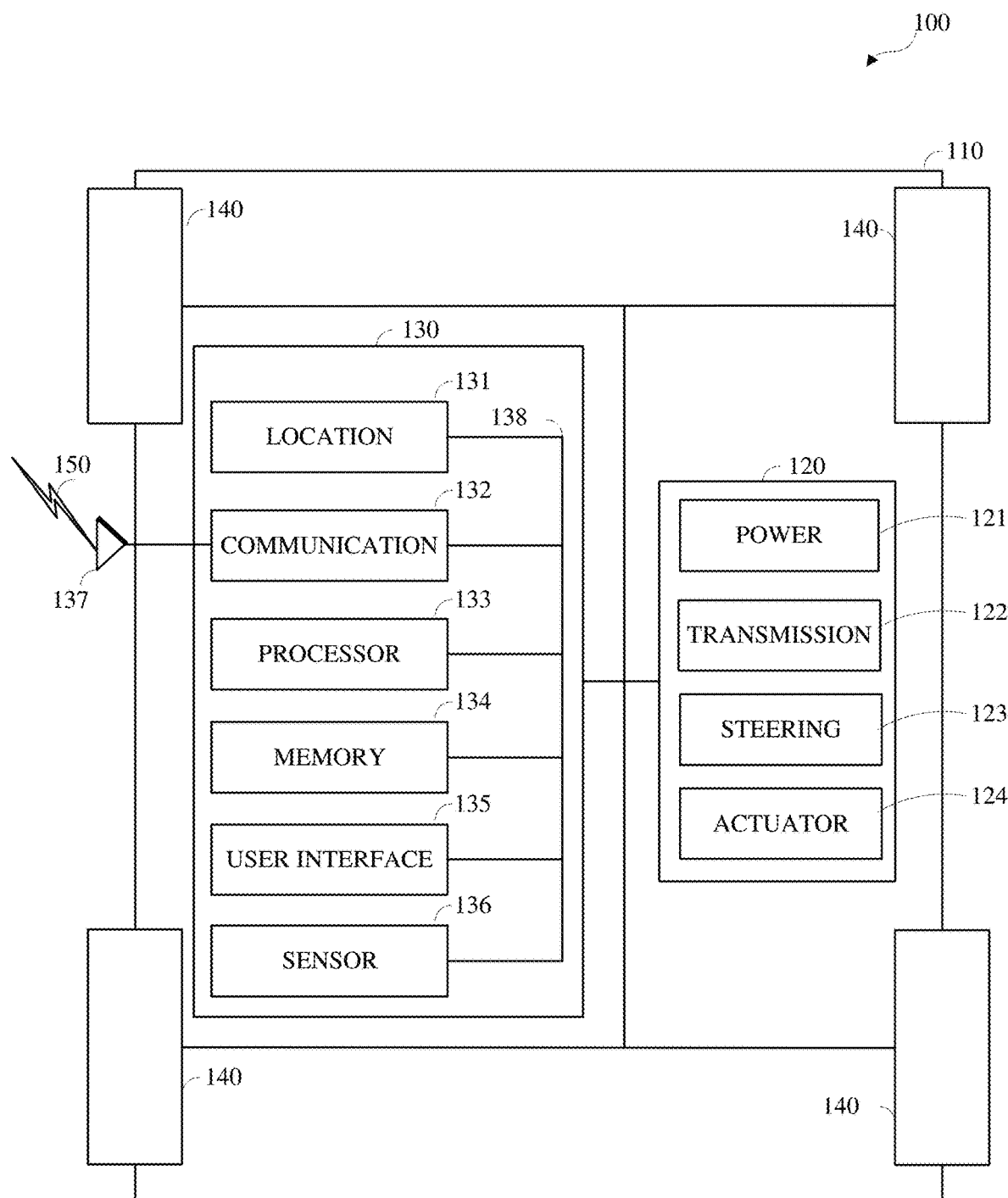
FIG. 1 is a diagram of an example of a vehicle in which the aspects, features, and elements disclosed herein may be implemented.

A vehicle, such as an autonomous vehicle (AV), a semi-autonomous vehicle, or other vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may identify information corresponding to one or more external objects, such as pedestrians, remote vehicles, other objects within the vehicle operational environment, vehicle transportation network geometry, or a combination thereof. This may be referred to herein as on-vehicle object detection, or simply object detection.

Object detection may be used in conjunction with one or more maps stored locally or one or more remote maps available to the vehicle to suggest actions or to take actions during operation of the vehicle in an intersection of the vehicle transportation network. For example, a vehicle may be dependent on high-definition maps that are remotely generated and generally contain locations of all traffic signs and roads that may be used by the vehicle. If a map is pre-loaded (that is, stored locally within the vehicle), the static nature of the data therein between updates can impede navigation and decision-making. Alternatively, the map may be dynamically provided from, for example, a remote vehicle support system. In this case, however, the map may be unavailable at times due to communication problems or other issues. Further, while the update frequency may be quicker than when using a pre-loaded map, corrections for new or updated locations are not immediately available. In either case, over-reliance on such maps can be undesirable. Less detailed maps may not have all the information related to locations of interest.

The above implies that the object detection is accurate. Object detection itself has differing degrees of accuracy. This may be indicated by a probability or some other measure that indicates how well an object identified with the sensor data matches an object from a number of known objects. Sensors have differing sensitivities. Further, conditions when operating in the vehicle transportation system may reduce the effectiveness or accuracy of the sensors below a desired level, particularly where a map is unavailable or has incomplete data. With regards to an intersection, for example, a traffic flow control device may be partially or completely occluded, resulting in a low confidence in the sensor data to identify the traffic flow control device.

The present disclosure addresses such low-confidence object detection conditions for the vehicle to successfully operate within a vehicle transportation network. Accurately identifying and subsequently annotating and mapping objects, such as traffic flow control devices, reduce reliance on remotely-generated (e.g., the high-definition) maps. Details are described below starting with a description of a vehicle which the invention may be used. The teachings herein are described generally with regards to operation of an AV as an example. As will be clear from the description, the teachings herein may be used with an AV, a semi-autonomous vehicle, or any other vehicle that uses sensor data for object detection.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are applicable to a semi-autonomous vehicle, or other vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
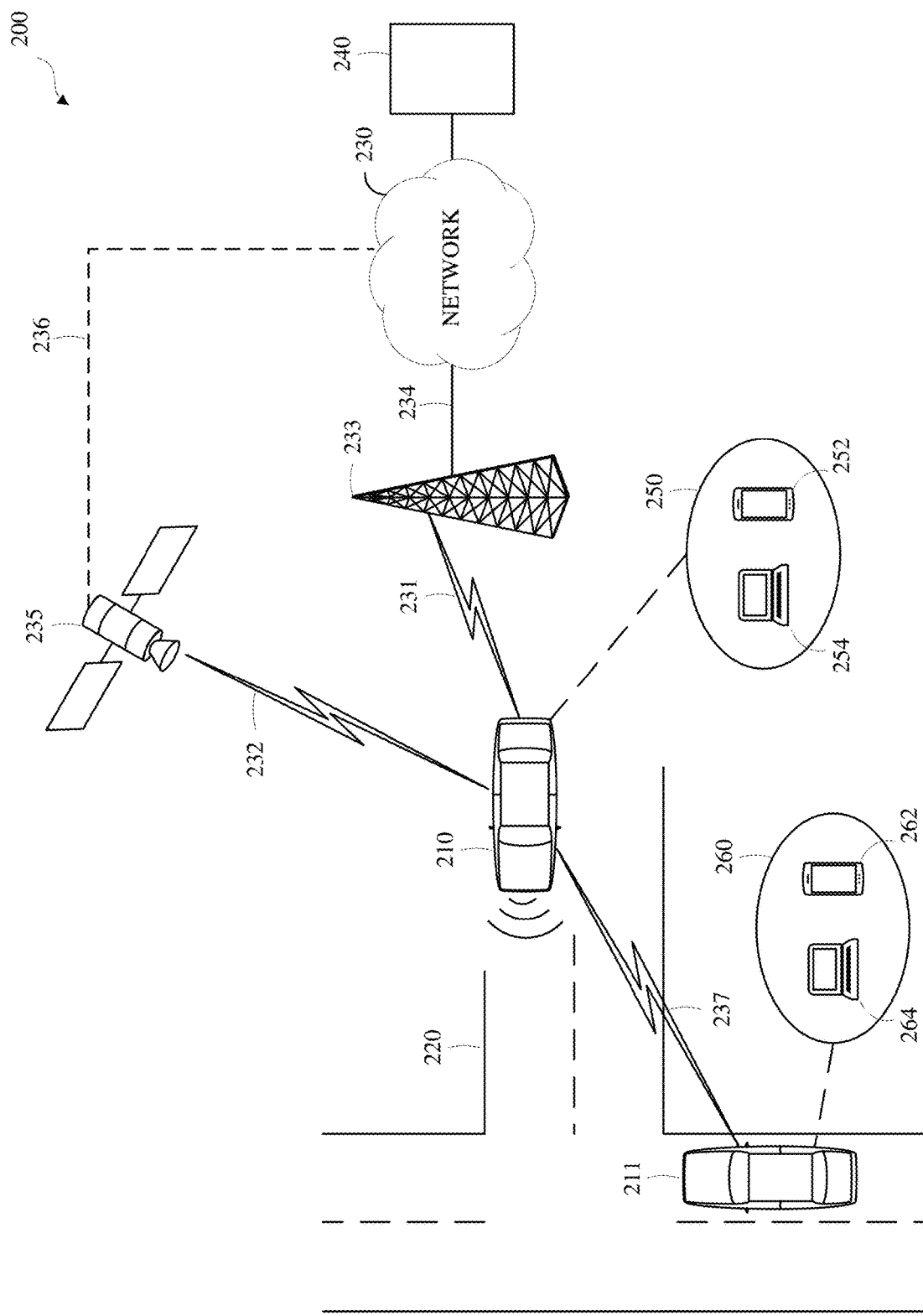
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220 and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
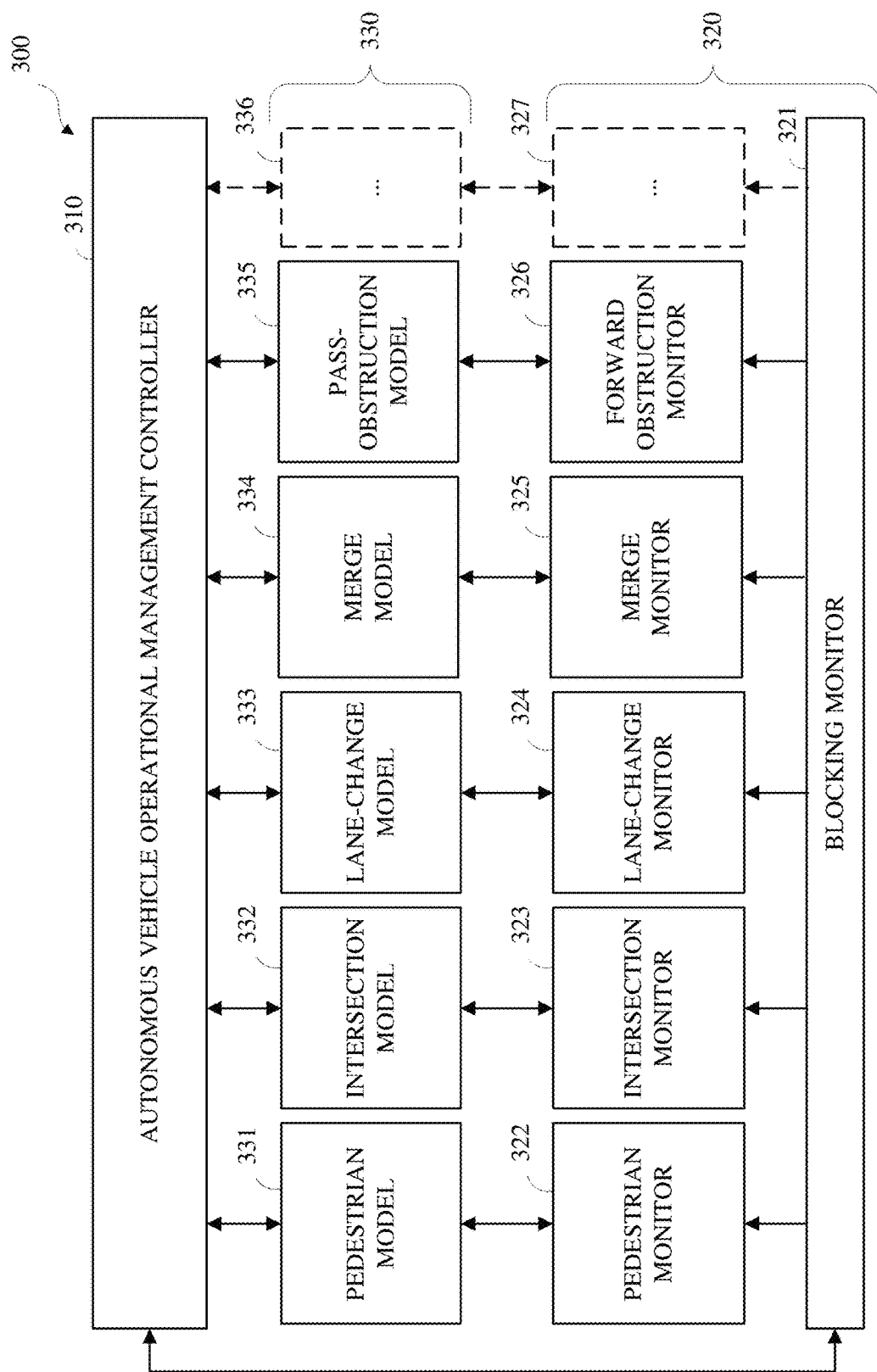
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 3, the autonomous vehicle operational management system 300 includes an autonomous vehicle operational management controller (AVOMC) 310, operational environment monitors 320, and operation control evaluation modules (also referred to as models) 330.

The AVOMC 310 may receive, identify, or otherwise access, operational environment data representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 300 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 310 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received from the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment data representing aspects of the operational environment of the autonomous vehicle, and output the operational environment data to one or more scenario-specific monitor, the AVOMC 310, or a combination thereof, as discussed in further detail below. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment data representing scenario-specific aspects of the operational environment of the autonomous vehicle, and output the operational environment data to one or more operation control evaluation models 330, the AVOMC 310, or a combination thereof.

For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment data to one or more elements of the autonomous vehicle operational management system 300, such as the AVOMC 310. Although not shown in FIG. 3, a scenario-specific operational environment monitor 322, 323, 324, 325, 326 may output operational environment data to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more remote vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

While shown as an operation environment monitor 320, the blocking monitor 321 may be a separate monitoring device. The blocking monitor 321 may receive operational environment data representing an operational environment, or an aspect thereof, for the autonomous vehicle. For example, the blocking monitor 321 may receive the operational environment information from the AVOMC 310, from a sensor of the vehicle, from an external device, such as a remote vehicle or an infrastructure device, or a combination thereof. The blocking monitor 321 may read the operational environment information, or a portion thereof, from a memory, such as a memory of the autonomous vehicle, such as the memory 134 shown in FIG. 1.

The blocking monitor 321, using this input, may determine a respective probability of availability (POA), or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 321 may identify a respective probability of availability for each of multiple portions of the vehicle transportation network within an operational environment of the autonomous vehicle, such as within 300 meters of the autonomous vehicle. The blocking monitor 321 may determine, or update, probabilities of availability continually or periodically. The blocking monitor 321 may communicate probabilities of availability, or corresponding blocking probabilities, to the AVOMC 310.

A probability of availability may be indicated by the blocking monitor 321 corresponding to each external object in the operational environment of the autonomous vehicle and a geospatial area may be associated with multiple probabilities of availability corresponding to multiple external objects. An aggregate probability of availability may be indicated by the blocking monitor 321 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types.

The blocking monitor 321 may identify external objects, track external objects, project location information, path information, or both for external objects, or a combination thereof. For example, the blocking monitor 321 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 321 may communicate probabilities of availability, or corresponding blocking probabilities, to the AVOMC 310. The AVOMC 310 may communicate the probabilities of availability, or corresponding blocking probabilities, to respective instantiated instances of the operational control evaluation modules 330.

The AVOMC 310 may identify one or more distinct vehicle operational scenarios based on one or more aspects of the operational environment represented by the operational environment data. For example, the AVOMC 310 may identify a distinct vehicle operational scenario in response to identifying, or based on, the operational environment data indicated by one or more of the operational environment monitors 320. The distinct vehicle operational scenario may be identified based on route data, sensor data, or a combination thereof. For example, the AVOMC 310 may identify one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models 330 based on one or more aspects of the operational environment represented by the operational environment data, such as the identification of an upcoming scenario. An upcoming scenario may be a distinct vehicle operational scenario that the AVOMC 310 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

The operation control evaluation models 330 may include scenario-specific operation control evaluation model (SSOCEMs), such as a pedestrian-SSOCEM 331, an intersection-SSOCEM 332, a lane-change-SSOCEM 333, a merge-SSOCEM 334, a pass-obstruction-SSOCEM 335, or a combination thereof. A SSOCEM 336 is shown using broken lines to indicate that the autonomous vehicle operational management system 300 may include any number of SSOCEMs 330. For example, the AVOMC 310 may instantiate an instance of a SSOCEM 330 in response to identifying a distinct vehicle operational scenario. The AVOMC 310 may instantiate multiple instances of one or more SSOCEMs 330 based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian.

The AVOMC 310 may send the operational environment data, or one or more aspects thereof, to another unit of the autonomous vehicle, such as the blocking monitor 321 or one or more instances of the SSOCEMs 330. For example, the AVOMC 310 may communicate the probabilities of availability, or corresponding blocking probabilities, received from the blocking monitor 321 to respective instantiated instances of the SSOCEMs 330. The AVOMC 310 may store the operational environment data, or one or more aspects thereof, such as in a memory, such as the memory 134 shown in FIG. 1, of the autonomous vehicle.

Although not expressly shown in FIG. 3, the autonomous vehicle operational management system 300 may include a predictor module that may generate and send prediction information to the blocking monitor 321, and the blocking monitor 321 may output probability of availability information to one or more of the other operational environment monitors 320.

A SSOCEM 330, once instantiated, can receive the operational environment information, including sensor data, to determine and output a candidate vehicle control action, also called a candidate action herein. A candidate action is a vehicle control action that is identified by the particular SSOCEM 330 as the likely optimal action for the vehicle to perform that will handle a particular scenario. For instance, a SSOCEM 330 configured to handle intersections (e.g., an intersection SSOCEM 332) may output a "proceed", a candidate action that suggests proceeding through an intersection. At the same time, a SSOCEM 330 for handling lane changes (e.g., the lane change SSOCEM 333) may output a "turn left" candidate action indicating that the vehicle should merge left by two degrees. In some implementations, each SSOCEM 330 outputs a confidence score indicating a degree of confidence in the candidate action determined by the SSOCEM 330. For instance, a confidence score greater than 0.95 may indicate a very high confidence in the candidate action, while a confidence score less than 0.5 may indicate a relatively low degree of confidence in the candidate action. Further details of a SSOCEM 330 are described below.

The AVOMC 310 may receive one or more candidate actions from respective instances of the SSOCEMs 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network.

In some implementations, the AVOMC 310 utilizes hard-coded logic to determine the vehicle control action from the candidate actions. For example, the AVOMC 310 may select the candidate action having the highest confidence score. In other implementations, the AVOMC 310 may select the candidate action that is the least likely to result in a collision. In other implementations, the AVOMC 310 may generate a compound action based on two or more non-conflicting candidate actions (e.g., compounding 'proceed' and 'turn left by two degrees' control actions to result in a vehicle control action that causes the vehicle to veer left and proceed through an intersection). In some implementations, the AVOMC 310 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a Partially Observable Markov Decision Process (POMDP), which may describe how respective candidate actions affect subsequent candidate actions, and may include a reward function that outputs a positive or negative reward for respective vehicle control actions.

The AVOMC 310 may uninstantiate an instance of a SSOCEM 330. For example, the AVOMC 310 may identify a distinct set of operative conditions as indicating a distinct vehicle operational scenario for the autonomous vehicle, instantiate an instance of a SSOCEM 330 for the distinct vehicle operational scenario, monitor the operative conditions, subsequently determine that one or more of the operative conditions has expired, or has a probability of affecting the operation of the autonomous vehicle below a defined threshold, and the AVOMC 310 may uninstantiate the instance of the SSOCEM 330.

As referred to briefly above, a SSOCEM 330 may model a respective distinct vehicle operational scenario. The autonomous vehicle operational management system 300 includes any number of SSOCEMs 330, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 330 may include one or more models that are configured to determine one or more vehicle control actions for handling a scenario given a set of inputs. The models may include, but are not limited to, POMDP models, MDP models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Each SSOCEM 330 includes computer-executable instructions that define a manner by which the models operate and a manner by which the models are utilized.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSOCEM 335 may be POMDP models. In another example, the pedestrian-SSOCEM 331 may be an MDP model and the intersection-SSOCEM 332 may be a POMDP model. The AVOMC 310 may instantiate any number of instances of the SSOCEMs 330 based on the operational environment data. A module 336 is shown using broken lines to indicate that the autonomous vehicle operational management system 300 may include any number or additional types of SSOCEMs 330.

One or more of the AVOMC 310, the operational environment monitors 320, or the SSOCEMs 330 may operate continuously or periodically, such as at a frequency of ten hertz (10 Hz). For example, the AVOMC 310 may identify a vehicle control action many times, such as ten times, per second. The operational frequency of each component of the autonomous vehicle operational management system 300 may be synchronized or unsynchronized, and the operational rate of one or more of the AVOMC 310, the operational environment monitors 320, or the SSOCEMs 330 may be independent of the operational rate of others.

As is clear from the above description, these models are complex, and accurate detection and identification of objects is important for the proper selection of vehicle control actions. Accuracy is a similar concern for suggesting vehicle control actions in semi-autonomous or conventional vehicles. The teachings herein allow the identification of objects such as traffic flow control devices, even when partially or completely occluded, and whether a map available to the vehicle includes the object. The location and identification of the object may be annotated and mapped. That is, a label including this information may be tagged within one or more control systems for vehicle operation.

Figure 4:
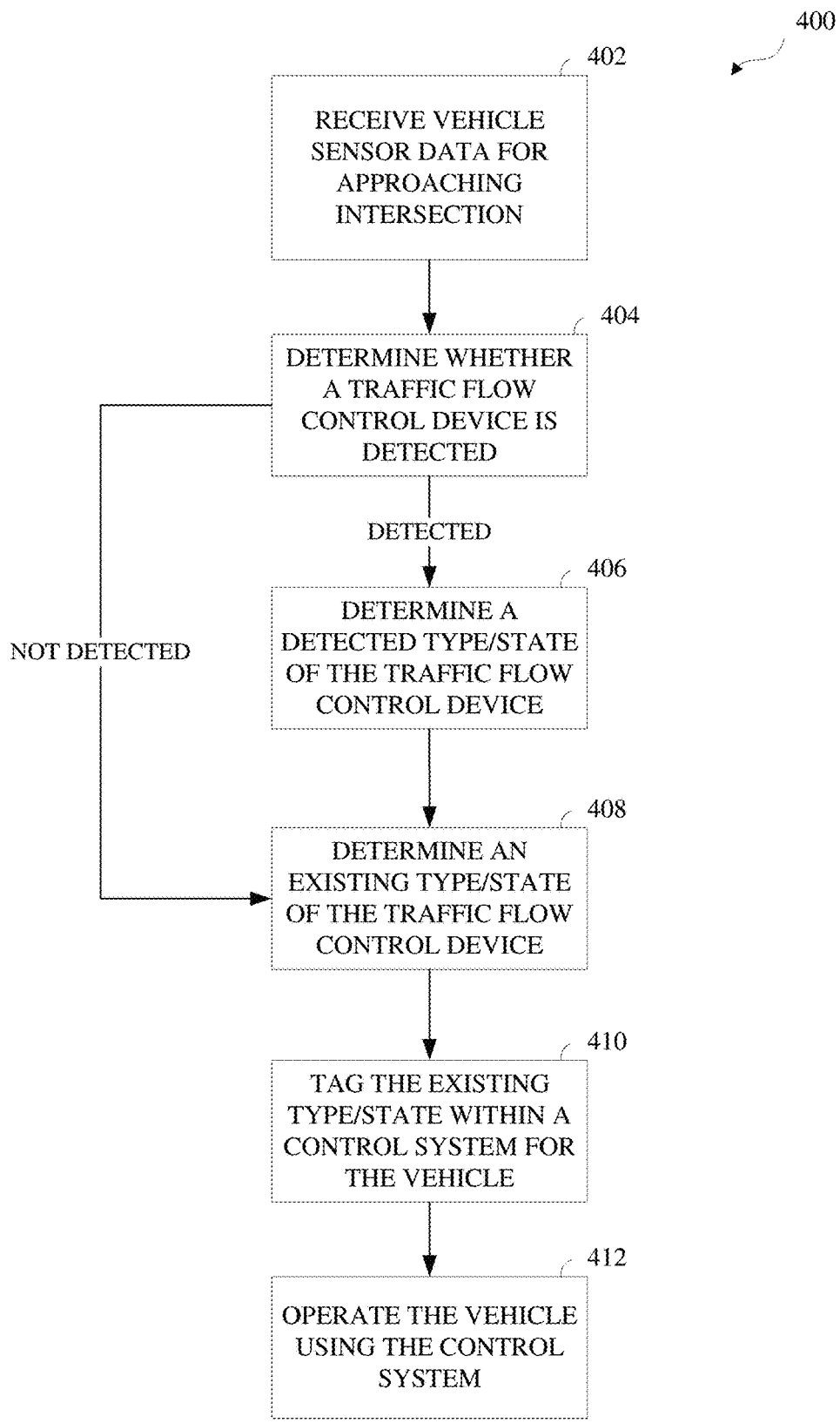
FIG. 4 is a flow chart of a method for operating a vehicle that addresses low-confidence object detection conditions according to the teachings herein.

FIG. 4 is a flow chart of a method 400 for operating a vehicle that addresses low-confidence object detection conditions according to the teachings herein. The method 400 may be performed by a processor incorporated within a computer, a controller, or any combination of hardware, with or without software. The method 400 may be performed at the vehicle, such as by the processor 133. The method 400 may be performed remotely at least in part, such as by a processor or other hardware and optionally software at a remote vehicle support system, such as at a remote assistance support incorporating communication device 240.

At 402, sensor data is received from at least one vehicle-mounted sensor as the vehicle approaches an intersection within a vehicle transportation network, such as the T-shaped intersection shown in FIG. 2. A vehicle-mounted sensor may be any sensor, such as the sensor 136 described above, that detects conditions external of the vehicle, such as the vehicle 100 or either of the vehicles 210/211.

At 404, the sensor data is used to determine whether a traffic flow control device for the intersection is detected. At 406, at least one of a detected type or a detected state of the traffic flow control device is determined when the traffic control device is detected. Processing at 404 and 406 may be discussed in more detail with reference to FIG. 5, which is a flow chart of a method 500 of detecting a traffic flow control device according to the teachings herein.

Figure 5:
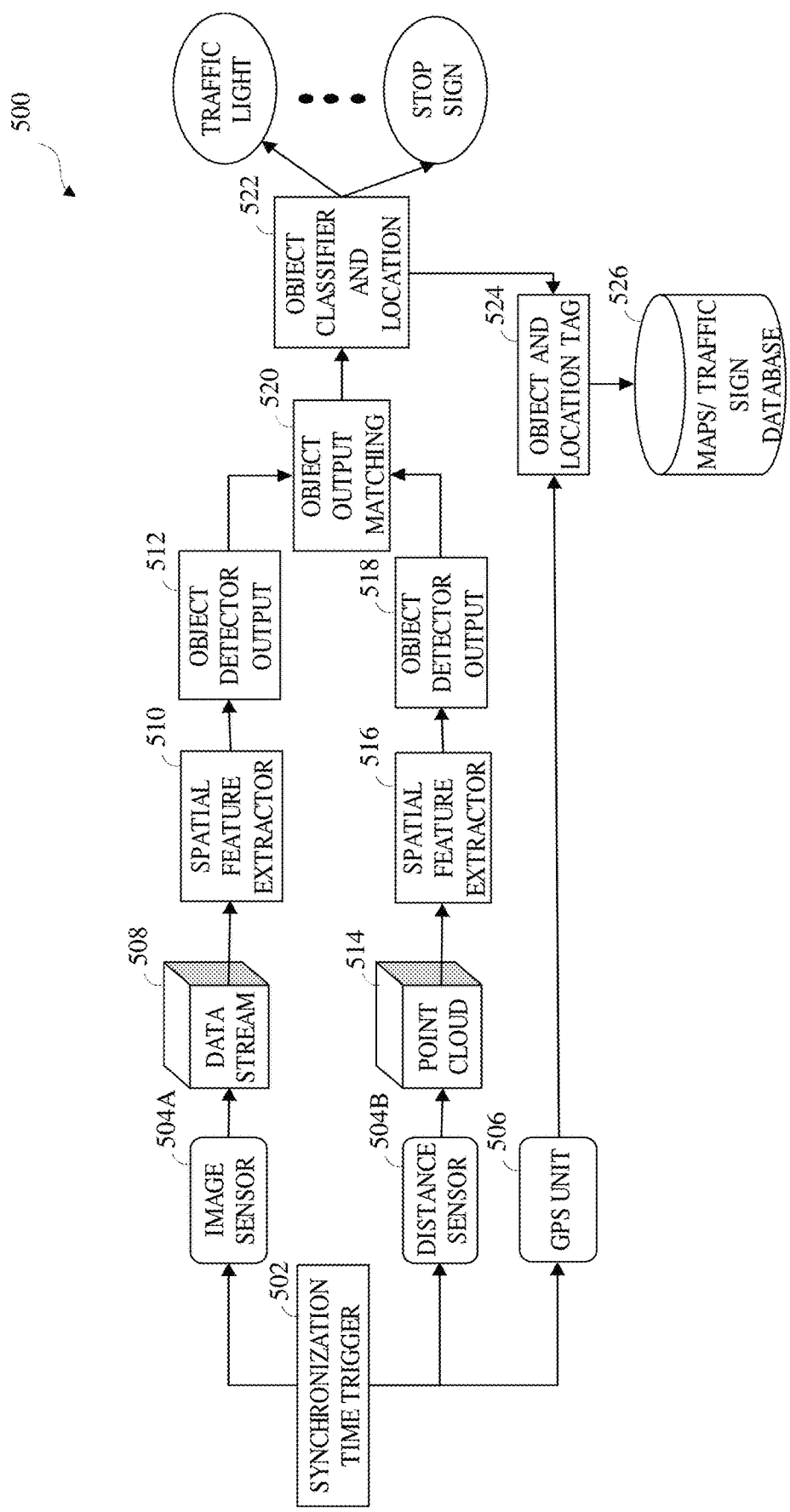
FIG. 5 is a flow chart of a method of detecting a traffic flow control device according to the teachings herein.

At 502, hardware of the vehicle used for the detection may be synchronized. The hardware includes two or more sensors that may be used to detect objects external to the vehicle. Desirably, but not necessarily, the sensors are different types of sensors. In FIG. 5, the method 500 uses an image sensor 504A and a distance sensor 504B, such as a LIDAR unit. The hardware may also include a location unit, such as a GPS unit 506, that can be used for identifying a location of the detected object within the vehicle transportation network. The sensor data received at 402 for the approaching intersection depends upon the type of sensor. In FIG. 5, the image sensor 504A transmits a data stream 508 as first sensor data and the distance sensor 504 transmits a point cloud 514 as second sensor data. The received first and second sensor data, data stream 508 and the point cloud 514, may be stored in a memory, such as the memory 134, for access by the processor, such as the processor 133, of the vehicle. Due to the synchronization of the hardware, the images of the data stream 508 are geometrically registered with the point cloud 514.

Beginning at 510, objects are detected within the intersection using the first sensor data. At 510, a spatial feature extractor is used to extract spatial features from the sensor data of the data stream 508. The spatial feature extractor may be implemented at 510 by inputting the data stream 508 into a trained machine-learning model, such as a convolution neural network, whose inferred output comprises the spatial features. The spatial features may comprise groups of pixels with respective values in a multi-dimensional coordinate system (e.g., two- or three-dimensional) that may represent lane lines, stop lines, pedestrians, other vehicles, traffic flow control devices, etc.

The spatial features extracted at 510 are used as input to an object detector at 512. The object detector parses the spatial features into likely objects, which are identified by, for example, respective bounding boxes, according to any desired technique. The object detector output from the processing at 512 may also include locations within the multi-dimensional coordinate system, a level of confidence that the bounding box is associated with an object instead of noise, a level of confidence that the bounding box encompasses the entirety of an object, other information that will aid the identification of the object, or some combination thereof. In this implementation, the objects are those within an intersection, where the phrase within an intersection includes above the intersection (such as hanging traffic lights), within a defined range about the intersection, within a defined distance from the intersection, or some combination thereof.

Beginning at 516, objects are detected within the intersection using the second sensor data. In this example, the sensor data of the point cloud 514 is processed similarly to that of the data stream 508. At 516, a spatial feature extractor is used to extract spatial features. The spatial feature extractor implemented at 516 may, like the spatial feature extractor implemented at 510, a trained machine-learning model, such as a convolution neural network. The point cloud 514 may be input into the model, which outputs the spatial features. Because the images of the data stream 508 are geometrically registered with the point cloud 514 in this example, the spatial features are defined in the same multi-dimensional coordinate system as those extracted from the data stream 508. In other implementations, the spatial features of the data stream 508 and the point cloud 514 may be extracted at 510 and 516 in respective multi-dimensional coordinate systems and subsequently converted, remapped, or otherwise adjusted to the same multi-dimensional coordinate systems before the object output matching at 520 described below.

The spatial features extracted at 516 are used as input to an object detector at 518. The object detector parses the spatial features into likely objects, which are identified by, for example, respective bounding boxes, according to any desired technique. Like the object detector output from the processing at 512, the object detector output from the processing at 516 may also include locations within the multi-dimensional coordinate system, a level of confidence that the bounding box is associated with an object instead of noise, a level of confidence that the bounding box encompasses the entirety of an object, other information that will aid the identification of the object within the intersection, or some combination thereof.

At 520, the method 500 includes object output matching. In object output matching, the objects detected using the first sensor data are compared to the objects detected using the second sensor data. When the data is consistent for an object (e.g., their characteristics or parameters match), the method 500 concludes that an object has been detected. As shown, the object detector output at 512 is compared to the object detector output at 518. The size and location (e.g., in the multi-dimensional space) of the bounding boxes may be compared to determine the matching at 522. For example, where a bounding box from the object detector output at 512 overlaps a bounding box from the object detector output at 518, and the bounding boxes are within a defined size margin, the object may be considered a match at 520.

In FIG. 5, the matching objects from 520, including their respective locations, are provided to an object classifier at 522. The object classification at 522 may use pattern recognition software, or some other means, of classifying the object as a traffic flow control device or another object within the intersection. For example, the object classifier may classify a matching object at 522 as a type of a traffic flow control device such as a traffic light, a stop sign, a yield sign, a single flashing light, etc. In some implementations, where the object is a type of a traffic flow control device, and that type of traffic flow control device is associated with multiple states, the state of the traffic control device may also be part of the object classification at 522. For example, the traffic flow control device type of traffic light is associated generally with three states—red, yellow, or green. A single flashing light may be associated with either a state of red or a state of yellow.

Although the object classification at 522 is described as occurring after matching at 520, in some implementations processing of each of the first and second sensor data may include a respective object classification step before the object output matching at 520. More generally, then, at least one of the objects detected using the first sensor data or at least one of the objects detected using the second sensor data may be classified according to the teachings herein, either before or after matching.

The classified object may be tagged with a label (e.g., its type and optionally its state) and a location at 524, and then stored in a database 526 that includes, for example, one or more maps and traffic flow control devices (sometimes referred to as signs). The location may be determined by converting the location of the classified object in the multi-dimensional coordinate system to a geospatial location using the GPS unit 506, the coordinate system of a map or maps stored in the database 526, or both.

According to the description of the method 500 above, the determination may be made at that a traffic flow control device is undetected at 404 when at least one of no object of the objects detected using the first sensor data or no object of the objects detected using the second sensor data is classified as a traffic flow control device type. In contrast, a determination may be made that a traffic flow control device is detected by the sensor data at 404 when characteristics of an object of the objects detected using the first sensor data match characteristics of an object of the objects detected using the second sensor data, and when at least one of the object of the objects detected using the first sensor data or the object of the objects detected using the second sensor data is classified as a traffic flow control device type.

The description of FIG. 5 above does not expressly address whether a traffic flow control device is detected, using the sensor data, with at least a defined level of detection confidence. A level of detection confidence may be any value that reflects the level of confidence in the accuracy of the determination of the detected type and/or the detected state using the sensor data. For example, the level of detection confidence may be a percentage or other value that indicates how similar the detected object is to its classification as a result of the analysis at 522. The level of detection confidence may include or be combined with other values, such as the amount of the overlap in the matching at 520. A relatively small overlap may indicate a low level of detection confidence, while a relatively large overlap may indicate a high level of detection confidence. The level of detection confidence may also include or be combined with other values, such as those related to the relative accuracy or sensitivity of the sensors, such as the image sensor 504 and the distance sensor 504B, or those related to the relative accuracy and sensitivity of the spatial feature extraction (e.g., at 510, 516) and object detection (e.g., at 512, 518) for each sensor. Higher levels of accuracy in a sensor or object detection using its input may be used to weight its sensor data higher than another in the matching at 520, for example.

The defined level of detection confidence is a value that indicates whether the determination of the detected type and/or the detected state is sufficiently accurate, which may depend on other conditions or objects within the intersection. For example, a level of detection confidence in a conclusion that the detected type of a traffic flow control device is a stop sign may be 80%. A defined level of detection confidence may be, for example, 85% by default. Accordingly, the detected type of the traffic flow control device is determined with less than the defined level of detection confidence. If there are no dynamic objects identified as pedestrians or other vehicles within the intersection, the defined level of detection confidence may be lowered to 75%, while such a presence may make raising the defined level of detection confidence. A complicated intersection geometry with many arms, lanes, or both (such as a four-way intersection) may make a higher defined level of detection confidence higher than that for a simpler intersection, such as a three-way intersection.

In some implementations, more than one defined level of detection confidence may be used. For example, a conclusion that the traffic flow control device is undetected at 404 may be reached when the level of detection confidence is below a first defined level, or a conclusion that the at least one of the detected type or the detected state of the traffic flow control device is determined with less than a defined level of detection confidence at 406 may be made using a second defined level, where the second defined level is a higher level of confidence in the accuracy of the object classification than the first defined level. It is also possible that the defined level of detection confidence differs for a detected state as compared to a detected type of the traffic flow control device.

Figure 6:
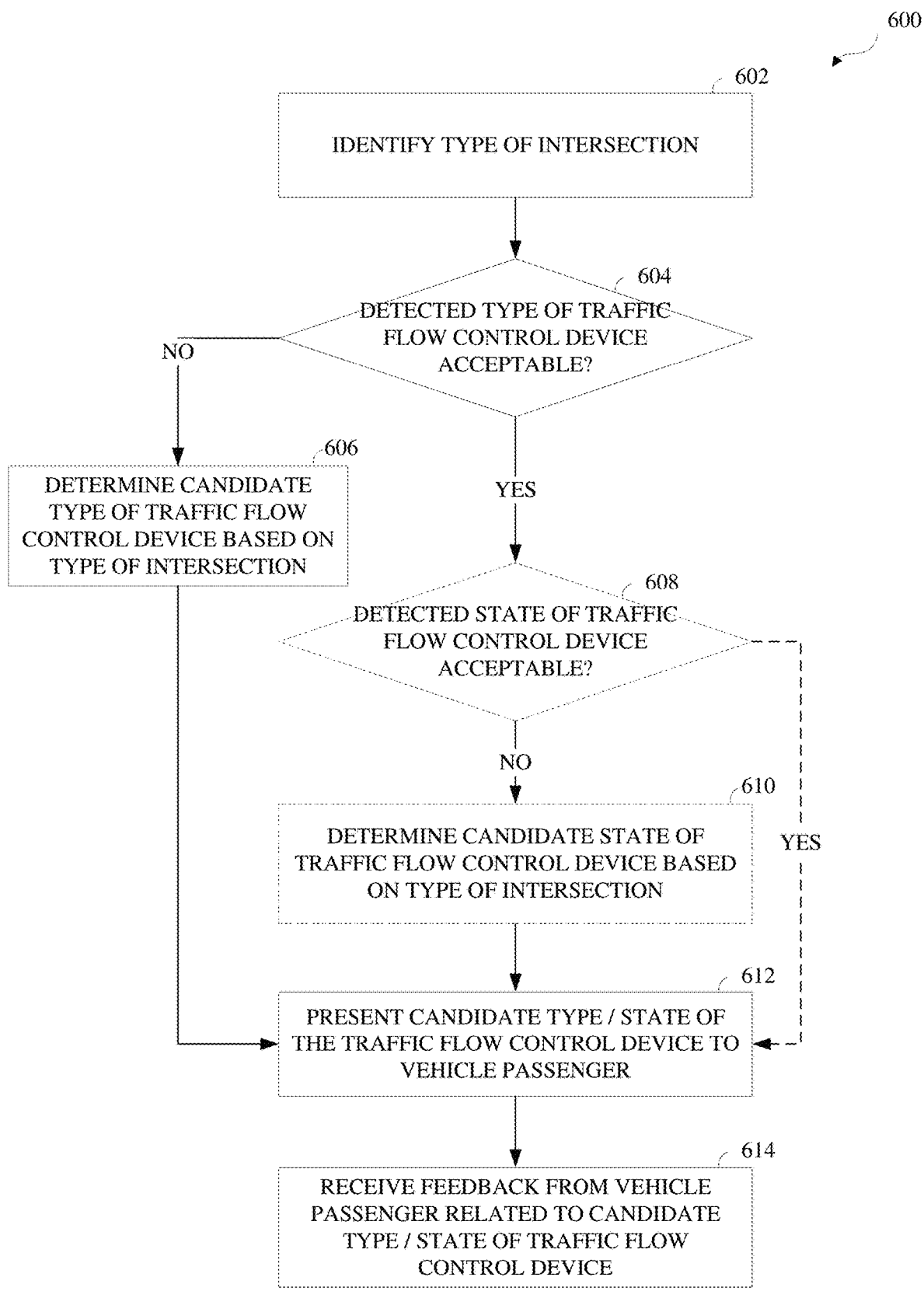
FIG. 6 is a flow chart of a method of determining an existing type, an existing state, or both of a traffic flow control device according the method of FIG. 4.

In any event, and referring again to FIG. 4, where the traffic flow control device is undetected at 404 or the at least one of the detected type or the detected state of the traffic flow control device is determined with less than the defined level of detection confidence at 406, at least one of an existing type or an existing state of the traffic flow control device may be determined using a type of the intersection at 408. An example of the processing at 408 may be seen by reference to FIG. 6, which is a flow chart of a method 600 of determining the existing type, the existing state, or both, of the traffic flow control device using a type of the intersection.

At 602, the type of the intersection is identified or determined. The type of the intersection may be indicated by a geometry of the intersection, a status of the intersection as a mapped intersection or an unmapped intersection, or both. In addition to the type of intersection, the status of other detected objects within or approaching the intersection may be used in the determination at 408, as discussed in further detail below.

Beginning at 604, the defined level of detection confidence may be compared to the level of detection confidence to determine whether to accept the detected type as an actual, existing type, whether to accept the detected state, if any, as an actual, existing state, or whether to perform further processing in the determination of the actual, existing traffic flow control device.

In this example, a determination is made at 604 as to whether the detected type of the traffic flow control device is relatively accurate, such that the detected type is or may be acceptable as the existing type. If the detected type of the traffic flow control device is determined with less than the defined level of detection confidence (e.g., it has a level of detection confidence less than the defined level), or the traffic flow control device is undetected such that no detected type exists, processing advances to 606. At 606, at least one of a candidate type of the traffic flow control device or a candidate state of the traffic flow control device is determined based on the type of the intersection determined at 602. For example, where a candidate type of the traffic flow control device does not have a state (such as a stop sign), only the candidate type is determined at 606. Where the candidate type of the traffic flow control device determined at 606 is one that also has a state (such as a traffic light), a candidate state of the traffic flow control device is also determined at 606 in this example. This is based on assumption that a detected state of the traffic flow control device, if any, is unlikely to be accurate if the detected type of the traffic flow control device has a level of detection confidence less than the defined level of detection confidence.

The candidate type(s) and the candidate state(s), if any, are subsequently presented to a vehicle passenger at 612 for consideration, which is described below. Examples of the candidate type determination at 606 and optionally the candidate state determination using the type of intersection are also described below.

Referring back to step 604, if the determination is made at 604 that the detected type of the traffic flow control device exists and is relatively accurate such that the detected type is or may be acceptable as the existing type, processing optionally advances to 608 and then optionally to 610. Processing at 608 includes a determination as to whether the detected state of the traffic flow control device is relatively accurate, such that the detected state is or may be acceptable as the existing state. If the state is undetected, or the detected state of the traffic flow control device is determined with less than the defined level of detection confidence (e.g., it has a level of detection confidence less than the defined level), processing advances to 610.

At 610, a candidate state of the traffic flow control device is determined based on the type of the intersection determined at 602. For example, if the detected type is determined with sufficient detection confidence at 604 to be a type with multiple possible states, the candidate state for the traffic flow control device may be one of the possible states of the traffic flow control device type. This sequence can occur where, for example, the object classified at 522 is at least partially occluded from one or more of the sensors such that detected type, e.g., a traffic light, is at least at the defined level of detection confidence, but the detected state, if any, is below the defined level of detection confidence. Determining a candidate state is described in further detail below.

Each of steps 608 and 610 is described as optional. For example, where the detected type of the traffic flow control device is determined with sufficient detection confidence at 604 to be a type without multiple possible states (such as a stop sign), the method 600 may end at 604 as a result of the detected type of the traffic flow control device being acceptable as the existing type of the traffic flow control device. Further, where a detected type of the traffic flow control device has a state (such as a traffic light), the method 600 may end at 608 as a result of the detected state of the traffic flow control device being determined with sufficient detection confidence at 608 to be acceptable as the existing state of the traffic flow control device.

Ending the method 600 at 604 or 608 results in a low amount of processing time for step 408 of FIG. 4. It may be required where the vehicle is an AV with no passengers. However, where there is a passenger in the vehicle, whether the vehicle is an AV or not, it can be more desirable to include steps 612 and 614 for additional accuracy, particularly where an intersection is unmapped in an existing map available to the vehicle. In this variation, determining the at least one of the existing type or the existing state of the traffic flow control device at 408 includes presenting to a passenger of the vehicle, by at least one of a visual or an audio interface of the vehicle, a candidate type of the traffic flow control device, a candidate state of the traffic flow control device, or both the candidate type and the candidate state of the traffic flow control device at 612, and receiving, from the passenger, feedback indicating whether the candidate type is the existing type of the traffic flow control device, whether the candidate state is the existing state of the traffic flow control device, or whether both the candidate type is the existing type of the traffic flow control device and the candidate state is the existing state of the traffic flow control device at 614.

The content of the presentation at 612 may depend on the determination at 604 or both the determination at 604 and the determination at 608. Where the determination is made at 604 that the detected type of the traffic flow control device exists and is relatively accurate such that the detected type is or may be acceptable as the existing type (e.g., the level of detection confidence of the detected type is at least as high as the defined level of detection confidence), the detected type is designated as the candidate type presented at 612. If the detected type is not a type of traffic flow control device that is associated with multiple states, a candidate state may be omitted from the presentation to the passenger at 612. If instead the detected type is a type of traffic flow control device that is associated with more than one state, and the determination is made at 608 that the detected state of the traffic flow control device exists and is relatively accurate such that the detected state is or may be acceptable as the existing state (e.g., the level of detection confidence of the detected state is at least as high as the defined level of detection confidence), the detected state is designated as the candidate state presented at 612. When instead the detected state of the traffic flow control device is determined with less than the defined level of detection confidence (e.g., it has a level of detection confidence less than the defined level) such that a candidate state of the traffic flow control device is determined at 610 occurs, the candidate state is including in the presentation to the passenger at 612.

In contrast to the above, and as noted previously, when the determination is made at 604 that the detected type of the traffic flow control device has a detection confidence less than the defined level of detection confidence, the content of the presentation at 612 may include one or more candidate types determined at 606, or one or more candidate types and one or more candidate states determined at 606.

In the description this far, the determinations at 604 and 608 are performed generally based on the defined level of detection accuracy and the detection accuracy of the detected traffic flow control device (e.g., the detected type or detected state). In some implementations, it may be desirable to consider the type of the intersection from 602 in the determination at 604, the determination at 608, or both determinations, such as whether the intersection is mapped or unmapped within an existing map available to the vehicle, the detected geometry of the intersection, or both, and optionally the characteristics of other objects detected within the intersection In a variation where the type of the intersection is considered, the method 600 may always advance from 604 to 606 under certain conditions related to the type of the intersection identified at 602. For example, this may occur when the intersection is unmapped within an existing map available to the vehicle, when the traffic flow control device is not within an existing map available to the vehicle (e.g., the intersection is mapped but the traffic flow control device does not match the mapped traffic flow control device for the intersection), or when the detected type of the traffic flow control device is inconsistent with the geometry of the intersection whether or not the intersection is mapped. In some implementations, the determination at 604 may be performed, and when the detected type of the traffic flow control device has a detection confidence at least as high as the defined level of detection confidence, the method 600 is forced to advance to 606 instead of 608 or 612 when one of these conditions is detected. In other implementations, when one of these conditions is detected, the level of the level of detection confidence for the detected type of the traffic flow control device may be reduced to less than the defined level of detection confidence so that the determination at 604 causes the method 600 to advance to 606 without further processing.

In each of these scenarios, the determination of the existing type may benefit from the availability of one or more candidate types generated by the processing at 606 that may or may not include the detected type. The determination of the existing state may also benefit because more or different states may be considered based on the candidate types.

In yet another variation where the type of the intersection is considered, if the intersection geometry is relatively complex, for example, more complex than a four-way intersection with two lanes for each arm, the method 600 may always advance to 606 from 604. Even in an implementation where a type of the intersection comprises a relatively simple intersection geometry, the existence of other objects in the intersection may always result in advancing to 606 from 604.

The intersection geometry, other objects detected within the intersection, or both, may be considered in combination with the level of detection accuracy to make the determination at 606. For example, the determination at 604 may determine a difference between the level of detection accuracy of the detected type and the defined level of detection accuracy and compare the difference to a difference threshold. When the level of detection accuracy for the detected type is higher than the defined level and the difference is less than the difference threshold, the method 600 can advance from 604 to 606 and can otherwise advance to 608 or 612 as described above. The difference threshold may depend on the intersection geometry and/or the other detected objects in the intersection such that the difference threshold is higher with higher complexity of the geometry and/or a higher number of detected objects, the types of detected objects, or their placement within the intersection that may increase the difficulty of traversing the intersection. A similar analysis may be made using the detected state of the traffic flow control device for the determination at 608 of whether to end the method 600, or to advance to 612.

As mentioned above, the type of intersection identified or determined at 602 may be used to determine one or more candidate types, one or more candidate states, or both, at 606. Examples of determining candidates for presentation at 612 using the type of intersection are next described.

In an example, the method 600 may determine that the intersection is unmapped within an existing map available to the vehicle. The candidate type of the traffic flow control device may be the detected type when the detected type of the traffic flow control device is consistent with a type of the intersection. The detected type of the traffic flow control device may be consistent with the type of the intersection when the detected type is consistent with the geometry of the intersection as detected by the at least one sensor. For example, a traffic flow control device type of a stop sign or a yield sign would be consistent with T-shaped intersection, a stop sign or a traffic light would be consistent with a three-way intersection that is not T-shaped, a traffic light would be consistent with intersections with greater than four arms, etc. These are just examples, and whether a traffic flow control device type is consistent with the intersection geometry may vary. Further, the candidate type of the traffic flow control device may be a traffic flow control device type that is consistent with a type of the intersection, whether the detected type of the traffic flow control device is consistent with the type of the intersection or not, and when the traffic flow control device is not detected.

When a candidate type is determined, that candidate type may be associated with a candidate state. In the example above where the intersection is unmapped, the candidate state of the traffic flow control device may be determined as the detected state when the detected type of the traffic flow control device is consistent with the type of the intersection. In a case where no detected state exists, such as when the traffic flow control device is not detected, the candidate state may be based on a type of the intersection, a state of at least one object within the intersection, or both. For example, where the type of the intersection refers to its geometry, a candidate type may be consistent with that geometry as described above. Where the candidate type may have multiple states, a candidate state be a traffic flow control device state corresponding to one of these states. Each of the possible states for the candidate type may also be determined as candidate states. Additional accuracy, however, may be achieved by considering a state of at least one object within the intersection that is detected using the sensor data.

More specifically, a candidate state may be determined at 606 or 610 as one or more of the possible states of the candidate type by considering whether a state of at least one other vehicle the intersection is stopped, decelerating, advancing without decelerating, turning a corner, etc. Where the candidate type is a traffic light, for example, a stopped vehicle in an adjacent lane to the vehicle in a four-way intersection may indicate that the traffic light is likely red, making red a possible candidate state for the existing state, while deceleration of the same vehicle in the adjacent lane may indicate that the light is yellow or red, again making red a possible candidate state and also making yellow a possible candidate state for the existing state. Other intersection types and detected objects may be similarly considered in determining a candidate state. In another example, a candidate type may be turn arrow, and the candidate state may be an off state or an on state. By observing other vehicle(s), one of these candidate states may be more likely and be presented first with the candidate type where, for example, there is no detected state.

In other examples of determining the candidate type at 606, the method 600 may determine that the intersection is mapped within an existing map available to the vehicle. A candidate type of the traffic may be determined as the detected type when the detected type of the traffic flow control device is inconsistent with (i.e., does not match) a traffic flow control device type of the intersection within the existing map because the existing map may be in error. A candidate type may also include the traffic flow control device type of the intersection within the existing map. The detected type also may be determined as a candidate type when it matches the previously-mapped traffic flow control device type. When the traffic flow control device is not detected, a candidate type may be determined as a traffic flow control device type based on a type of the intersection, such as the geometry of the intersection described above. In some implementations, when the traffic flow control device is not detected, a state of at least one object that is detected within the intersection may be considered as described above with regards to determining candidate states.

Once the candidate(s) for the traffic flow control device are determined at 606, or at 604 and optionally 610, they are presented to the passenger of the vehicle at 612 for feedback at 614 as mentioned briefly above. In more detail, a candidate type of the traffic flow control device is presented to the passenger, along with a candidate state of the traffic flow control device if applicable, by a user interface, such as the user interface 135. The user interface may include a visual interface, an audio interface, or both a visual interface and an audio interface. The passenger is requested for feedback through the user interface that indicates whether the candidate type is correct (i.e., whether it is the existing type that is actually within the intersection in the vehicle transportation network) and, when present, whether the candidate state is correct (i.e., whether it is the existing state that is actually shown with the candidate type within the intersection in the vehicle transportation network).

When there is more than one candidate type, all candidate types may be presented together for the passenger to provide one input to the user interface as feedback that indicates which candidate type is the existing type. Alternatively, the candidate types may be presented sequentially so the passenger can provide feedback regarding each in sequence. When there is more than one candidate state associated with a candidate type, each of the candidate states may be presented either concurrently or simultaneously with the candidate type. In some implementations, the passenger may be presented with the option to select from a list of possible traffic flow control device types, in addition to the candidate types, from which to identify the existing type. When the existing type can have multiple states, the passenger may be presented with the option to select from a list of possible states.

In addition to confirming the existing type of the traffic flow control device and, where applicable, the existing state of the traffic flow control device, the user interface may be used for identifying or confirming the exact location within the intersection. The user interface may be explained in additional detail with reference to FIG. 7, which is a diagram of examples of user interaction with the vehicle in accordance with the method 600 of FIG. 6.

Figure 7:
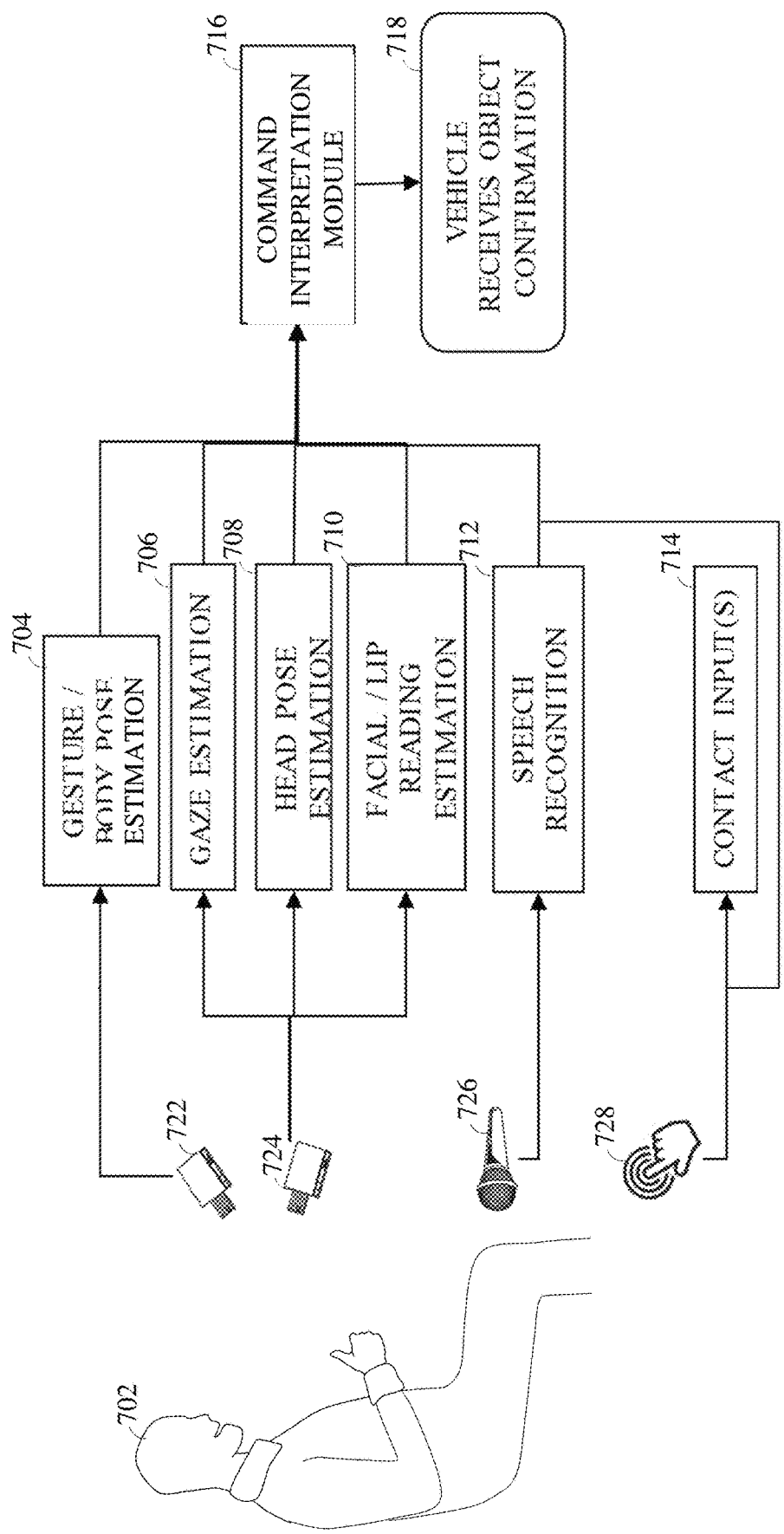
FIG. 7 is a diagram of examples of user interaction with the vehicle in accordance with the method of FIG. 6.

The presentation to the passenger 702 within a vehicle, such as the vehicle 100, 210, 211, may be made using a speaker that is part of an audio interface, a display screen, or both, such as the user interface 135. As can be seen in FIG. 7, the passenger 702 may provide feedback using multiple interface hardware components appropriately mounted or otherwise located within the vehicle. In this example, the visual interface includes a first image or video camera 720 pointing towards the body of the passenger 702 to receive feedback using a gesture or body pose estimation process 704 and a second image or video camera 722 pointing towards the head of the passenger 702 to receive feedback using a gaze estimation process 706, a head pose estimation process 708, a facial or lip reading estimation process 710, or some combination thereof. The audio interface includes a microphone 724 to receive feedback using a speech recognition process 712. FIG. 7 also includes a haptic interface (such as a button 726 on a touchscreen display) to receive feedback as contact input(s) 714. While several devices are shown to receive feedback, the teachings herein are not limited to these devices. Moreover, not all the devices may be used. Only one device to provide feedback is required. When a video camera pointing towards the head is used for feedback, not all of the estimation processes 706, 708, and 710 are required. Only one or two of the estimation processes may be used.

Although not shown in detail, one or more of the gesture or body pose estimation process 704, the gaze estimation process 706, the head pose estimation process 708, the facial or lip reading estimation process 710, and the speech recognition process 712 of FIG. 7 may be implemented by a respective neural network. The inputs to the neural network may be images of the body of the passenger 702 from the first camera 720, images of the face of the passenger 702 from the second camera 722, or utterances from the microphone 724. In some implementations, the contact inputs(s) 714 may be used as inputs to one or more of the neural networks. The layers of the neural network as shown are trained using a large number of training samples. For example, the neural network for the gaze estimation process 706 may be trained using a large number of training images associated with a known focal point fc of a passenger's gaze in three-dimensional space such that the trained neural network can infer the focal point fc of the gaze of the passenger 702 while the vehicle approaching the intersection. In this example, the focal point fc may provide feedback from the passenger 702 that identifies or confirms an existing type, an existing state, or both, of the traffic flow control device that are presented on a display screen. The focal point fc may provide feedback from the passenger 702 that identifies or confirms the location of the traffic flow control device.

The other estimation processes may use neural networks that are similarly trained for inferring (e.g., estimating) feedback from the passenger 702 while the vehicle is approaching the intersection. In the gesture or body pose estimation process 704, for example, the neural network may be trained to distinguish between hand gestures such that a different feedback is provided from the passenger 702 depending upon the hand gesture detected. Three different hand gestures may be used, for example, to indicate which of three candidate types corresponds to the existing type of the vehicle flow control device. Hand gestures may be used for various feedback. For example, a pointing gesture may be used to confirm or identify the location of the vehicle flow control device.

The feedback output from one or more of the gesture or body pose estimation process 704, the gaze estimation process 706, the head pose estimation process 708, the facial or lip reading estimation process 710, the speech recognition process 712, and the contact input(s) 714 may be supplied to the command interpretation module 716. The feedback may be combined in any way to interpret the commands from the passenger 702 so as to identify or confirm the existing type, or the existing type and the existing state of the vehicle flow control device, and to optionally identify or confirm its location at 718 for the vehicle.

Referring again to FIG. 4, at 410 the traffic flow control device is tagged within at least one control system for the vehicle with a label including a location of the traffic flow control device and the at least one of the existing type or the existing state of the traffic flow control device. As described above with regards to the tagging at 524, the label may be added to a map or traffic sign database 526. That is, for example, where the intersection is within a local map stored within a memory of the vehicle, the local map may be updated with the traffic flow control device using the label.

The database 526, and hence the tagged traffic flow control device may be incorporated with one or more control systems for the vehicle, such as an on-vehicle navigation system or an on-vehicle object detection system, or both. The on-vehicle navigation system can include route mapping or other navigation activities that rely on an accurate depiction of the remote transportation system. In some implementations, such as where the vehicle is an AV or a semi-autonomous vehicle, the on-vehicle navigation system and its tagged traffic flow control device may be incorporated as part of an autonomous vehicle operational management system, such as the autonomous vehicle operational management system 300 of FIG. 3.

With regards to the on-board object detection system, the label for the tagged traffic flow control device can be used within the system as part of a data and training pipeline to improve object detection accuracy using methods such as reinforcement learning.

At 412, the vehicle is operated within the vehicle transportation network using the at least one control system that incorporates the label for the traffic flow control device. For example, where the control system is an autonomous vehicle operational management system, such as the autonomous vehicle operational management system 300 of FIG. 3, the label for the traffic flow control device may be used for more accurate navigation through the vehicle transportation network, and in particular may be used for decision-making in traversing the intersection associated with the traffic flow control device. The object detection system of the vehicle may be used by the vehicle while operating within the vehicle transportation network that is improved through training using the label for the traffic flow control device.

The method 400 may be repeated for more than one intersection within the vehicle transportation network. Although not shown in FIG. 4, the method 400 may include, when the intersection is within an existing remote map that is available to the vehicle provided by a remote vehicle support system, transmitting, to the remote vehicle support system, the label for the traffic flow control device when at least one of the type or the location of the traffic flow control device is different from that of a traffic flow control device associated with the intersection within the remote map (e.g., the existing type does not match a known traffic flow control device for the intersection). The type may also be transmitted to the remote vehicle support system when the intersection is an unmapped intersection within the existing map available to the vehicle.

The disclosure herein supports decision-making in vehicle operation within a vehicle transportation network by addressing the absence and/or imperfections in the vehicle input data. In particular, for example, identifying and subsequently annotating and mapping objects, such as traffic flow control devices, in low-confidence object detection conditions are described.

The teachings describe techniques that can map and annotate or label traffic flow control devices while driving, which can reduce reliance on a complete, pre-loaded, high-definition map into the car. Further, the teachings can improve and speed up labelling in a vehicle transportation network over such techniques as transmitting image data to a remote vehicle support system for manual labelling. Instead of manual labelling and then verification, the vehicle can transmit mapped and labelled data to the remote vehicle support system for confirmation. The accuracy of the transmitted data may benefit from interaction of the vehicle and a passenger to confirm accuracy before transmission, and the time needed to include of the data in updated, remotely-generated maps may be reduced. The disclosure also takes advantage of scene understanding, including intersection geometry and objects within an intersection to infer object candidates for consideration by a passenger. Interaction with a passenger may incorporate techniques such as explainable artificial intelligence, which allows improvement over time in identifying and labeling objects.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method of operating a vehicle, comprising:
   receiving, at a processor of the vehicle, sensor data from at least one vehicle-mounted sensor as the vehicle approaches an intersection within a vehicle transportation network;
   determining, using the sensor data as input to an object classification system, that a traffic flow control device for the intersection is detected;
   determining a detection confidence of a detected type of the traffic flow control device from the object classification system, and, when the detected type has multiple possible states, a detection confidence of a detected state of the traffic flow control device from the object classification system;
   determining at least one of the detected type or the detected state of the traffic flow control device has less than a defined level of detection confidence, wherein the defined level of detection confidence varies based on dynamic objects approaching or within the intersection;
   determining, using the processor, at least one of an existing type of the traffic flow control device or an existing state of the traffic flow control device, wherein the detected type of the traffic flow control device is a candidate type for determining the existing type of the traffic flow control device, and when the detected type of the traffic flow control device has multiple possible states, the detected state of the traffic flow control device is a candidate state for determining the existing state of the traffic flow control device;
   tagging, within at least one control system for the vehicle, the traffic flow control device with a label including a location of the traffic flow control device and the at least one of the existing type or the existing state of the traffic flow control device; and
   operating the vehicle within the vehicle transportation network using the at least one control system that incorporates the label for the traffic flow control device.

2. The method of claim 1, wherein the at least one of the detected type or the detected state is determined with less than the defined level of detection confidence when the traffic flow control device is not within an existing map available to the vehicle.

3. The method of claim 1, comprising:
   identifying the type of the intersection as a mapped intersection within an existing map available to the vehicle; and determining that the detected type of the traffic flow control device does not match a known traffic flow control device for the mapped intersection, and wherein determining the existing type comprises confirming that one of the detected type or the known traffic flow control device is the existing type.

4. The method of claim 1, wherein determining, using the processor, the at least one of the existing type or the existing state of the traffic flow control device comprises:
presenting to a passenger of the vehicle, by at least one of a visual or an audio interface of the vehicle, at least one candidate type for determining the existing type that includes the detected type, at least one candidate state for determining the existing state that includes the detected state, or both the at least one candidate type and the at least one candidate state; and
receiving, from the passenger, feedback indicating which of the at least one candidate type is the existing type, which of the at least one candidate state is the existing state, or both which of the at least one candidate type is the existing type and which of the at least one candidate state is the existing state.

5. The method of claim 4, wherein the at least one of the candidate type of the traffic flow control device or the at least one of the candidate state of the traffic flow control device is based on the type of the intersection, and the type of the intersection includes a geometry of the intersection.

6. The method of claim 1, comprising:
identifying the type of the intersection as a mapped intersection within an existing map available to the vehicle; and
determining a second candidate type for determining the existing type of the traffic flow control device using a geometry of the intersection.

7. The method of claim 1, wherein:
the detected type of the traffic flow control device comprises a traffic signal;
the traffic signal is at least partially occluded such that the detected state of the traffic signal is below the defined level of detection confidence; and
determining the at least one of the existing type or the existing state of the traffic control device comprises determining that the existing state of the traffic signal is one of red or green using a state of at least one other vehicle within the intersection obtained by the sensor data.

8. The method of claim 1, wherein:
receiving the sensor data comprises:
first sensor data from an image sensor of the vehicle; and
second sensor data from a distance sensor of the vehicle; and the method comprises:
detecting objects within the intersection using the first sensor data;
detecting objects within the intersection using the second sensor data;
comparing the objects detected using the first sensor data to the objects detected using the second sensor data;
classifying at least one of the objects detected using the first sensor data or at least one of the objects detected using the second sensor data;
determining that the traffic flow control device is undetected when no object of the objects detected using the first sensor data is classified as a traffic flow control device type, no object of the objects detected using the second sensor data is classified as a traffic flow control device type, or both no object of the objects detected using the first sensor data and no object of the objects detected using the second sensor data are classified as a traffic flow control device type; and
determining that the traffic flow control device is detected by the sensor data when characteristics of an object of the objects detected using the first sensor data match characteristics of an object of the objects detected using the second sensor data, and when at least one of the object of the objects detected using the first sensor data or the object of the objects detected using the second sensor data is classified as a traffic flow control device type.

9. The method of claim 1, wherein the intersection is within an existing remote map that is available to the vehicle provided by a remote vehicle support system, the method comprising:
transmitting, to the remote vehicle support system, the label for the traffic flow control device when at least one of the type or the location of the traffic flow control device is different from that of a traffic flow control device associated with the intersection within the remote map.

10. The method of claim 1, wherein the intersection is within a local map stored within a memory of the vehicle, and the method comprises updating the local map with the traffic flow control device using the label.

11. An apparatus for operating a vehicle, comprising:
a processor configured to:
receive sensor data from at least one vehicle-mounted sensor as the vehicle approaches an intersection within a vehicle transportation network;
determine, using the sensor data as input to an object classification system, whether a traffic flow control device for the intersection is detected;
determine, when the traffic flow control device is detected, at least one of a detection confidence of a detected type of the traffic flow device from the object classification system or a detection confidence of a detected state of the traffic flow control device from the object classification system;
determine, when the traffic flow control device is detected, whether at least one of the detected type or the detected state of the traffic flow control device is determined with less than a defined level of detection confidence, wherein the defined level of detection confidence varies based on at least one of a type of the intersection or dynamic objects approaching or within the intersection;
determine, using the type of the intersection, at least one of an existing type of the traffic flow control device from at least one candidate type or an existing state of the traffic flow control device from at least one candidate state, wherein to determine the at least one of the existing type of the traffic flow control device from the at least one candidate type or the existing state of the traffic flow control device from the at least one candidate state comprises to:
where the traffic flow control device is undetected, determine the at least one candidate type using the type of the intersection, and where a candidate type has multiple possible states, determine the at least one candidate state using the multiple possible states; and
where the at least one of the detected type or the detected state of the traffic flow control device is determined with less than the defined level of detection confidence, determine the at least one candidate type using the type of the intersection and the detected type, and where a candidate type has multiple possible states, determine the at least one candidate state to include the detected state; and tag, within at least one control system for the vehicle, the traffic flow control device with a label including a location of the traffic flow control device and the at least one of the existing type or the existing state of the traffic flow control device, wherein the vehicle is configured to operate within the vehicle transportation network using the at least one control system that incorporates the label for the traffic flow control device.

12. The apparatus of claim 11, wherein to determine the at least one of the existing type or the existing state of the traffic flow control device comprises to:

present to a passenger of the vehicle, by at least one of a visual or an audio interface of the vehicle, the at least one candidate type of the traffic flow control device, the at least one candidate state of the traffic flow control device, or both the at least one candidate type and the at least one candidate state of the traffic flow control device; and receive, from the passenger, feedback indicating the existing type of the traffic flow control device, the existing state of the traffic flow control device, or both the existing type of the traffic flow control device and the existing state of the traffic flow control device.

13. The apparatus of claim 11, wherein the processor is configured to:

determine that the intersection is unmapped within an existing map available to the vehicle, and wherein to determine the at least one candidate type using the type of the intersection comprises to:

determine a traffic flow control device type as a candidate based on a geometry of the intersection.

14. The apparatus of claim 11, wherein the processor is configured to:

determine that the intersection is unmapped within an existing map available to the vehicle, and wherein to determine the at least one candidate state using the multiple possible states comprises to:

determine the at least one candidate state to include a traffic flow control device state of the multiple possible states based on a geometry of the intersection and based on a state of at least one object within the intersection.

15. The apparatus of claim 11, wherein the processor is configured to:

determine that the intersection is mapped within an existing map available to the vehicle, and wherein:

to determine the at least one candidate type of the traffic flow control device comprises:

to determine the at least one candidate type of the traffic flow control device as a traffic flow control device type of the intersection within the existing map and the detected type when the detected type of the traffic flow control device is inconsistent with the traffic flow control device type of the intersection within the existing map; and to determine the at least one candidate type of the traffic flow control device as the traffic flow control device type of the intersection within the existing map and a traffic flow control device type based on a geometry of the intersection when the traffic flow control device is not detected.

16. The apparatus of claim 11, wherein the processor is configured to:

determine that the intersection is mapped within an existing map available to the vehicle, and wherein to determine the at least one candidate state using the multiple possible states comprises to:

determine the at least one candidate state of the traffic flow control device as a traffic flow control device state of the candidate type based on at least one of a geometry of the intersection and a state of at least one object within the intersection.

17. The apparatus of claim 11, wherein the at least one control system comprises at least one of an on-vehicle navigation system or an on-vehicle object detection system of the vehicle.

18. The apparatus of claim 11, wherein the processor is configured to:

transmit, to a remote vehicle support system, the existing type when one of the intersection is a mapped intersection within an existing map available to the vehicle and the existing type does not match a known traffic flow control device for the intersection, or the intersection is an unmapped intersection within the existing map available to the vehicle.

19. A vehicle, comprising:

at least one vehicle-mounted sensor;
at least one control system; and
a processor configured to:
receive sensor data from the at least one vehicle-mounted sensor as the vehicle approaches an intersection within a vehicle transportation network;

determine, using the sensor data as input to an object classification system, a detected type and a detected state of a traffic flow control device for the intersection;

determine a detection confidence of the detected type of the traffic flow control device from the object classification system and a detection confidence of the detected state of the traffic flow control device from the object classification system;

determine at least one of the detected type or the detected state of the traffic flow control device has less than a defined level of detection confidence, wherein the defined level of detection confidence varies based on at least one of a type of the intersection or dynamic objects approaching or within the intersection;

determine an existing type of the traffic flow control device and an existing state of the traffic flow control device, wherein the detected type of the traffic flow control device is a candidate type for determining the existing type of the traffic flow control device, and, the detected state of the traffic flow control device is a candidate state for determining the existing state of the traffic flow control device; and tag, within the at least one control system, the traffic flow control device with a label including a location of the traffic flow control device and the at least one of the existing type or the existing state of the traffic flow control device; and wherein the vehicle is configured to operate the vehicle within the vehicle transportation network using the at least one control system that incorporates the label for the traffic flow control device.

20. The vehicle of claim 19, wherein at least one control system comprises at least one of an on-vehicle navigation system or an on-vehicle object detection system of the vehicle.

* * * * *